US012405947B2

United States Patent
Anilkumar et al.

(10) Patent No.: US 12,405,947 B2
(45) Date of Patent: Sep. 2, 2025

(54) STATEMENT-LEVEL INSTEAD-OF DATABASE TRIGGERS

(71) Applicant: Salesforce, Inc., San Francisco, CA (US)

(72) Inventors: Abhijith Anilkumar, San Francisco, CA (US); Douglas Doole, Livermore, CA (US); Simon Y. Wong, San Carlos, CA (US); Randy Philip Spalten, Benicia, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/428,583

(22) Filed: Jan. 31, 2024

(65) Prior Publication Data
US 2025/0245217 A1    Jul. 31, 2025

(51) Int. Cl.
*G06F 16/242* (2019.01)
*G06F 16/22* (2019.01)
(Continued)

(52) U.S. Cl.
CPC ...... *G06F 16/2435* (2019.01); *G06F 16/2282* (2019.01); *G06F 16/2365* (2019.01); *G06F 16/2393* (2019.01); *G06F 16/24565* (2019.01)

(58) Field of Classification Search
CPC .......... G06F 16/2435; G06F 16/2393; G06F 16/2282; G06F 16/2365; G06F 16/24565; G06F 16/242; G06F 16/2329
(Continued)

(56) References Cited

U.S. PATENT DOCUMENTS 5,546,576 A * 8/1996 Cochrane ............ G06F 16/2365
5,873,075 A * 2/1999 Cochrane ............ G06F 16/2452
(Continued)

FOREIGN PATENT DOCUMENTS

WO    2008042980 A3    4/2008
WO    2021225646 A1    11/2021

OTHER PUBLICATIONS

Sanjit K. Kaul et al., "Status Updates Through Queues," IEEE; 2012; pp. 1-6.
(Continued)

*Primary Examiner* — Shahid A Alam
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed relating to implementing a statement-level INSTEAD OF trigger. In one embodiment a computer system stores trigger information associated with a statement-level database trigger executable to initiate execution of at least one trigger instruction for a database instead of performing a particular database operation, on a database view, specified by a database operation statement. The computer system receives a first database operation statement specifying performance of the particular database operation on the database view and identifies a set of target rows, within the database view, targeted by the first database operation statement. In addition, the computer system generates a reference table associated with the database view, where the reference table includes rows corresponding to the target rows. The computer system executes the statement-level database trigger instead of executing the database operation statement, where executing the statement-level database trigger includes accessing the reference table.

20 Claims, 10 Drawing Sheets

(51) Int. Cl.
   *G06F 16/23* (2019.01)
   *G06F 16/2455* (2019.01)
(58) Field of Classification Search
   USPC .................................................. 707/769, 703
   See application file for complete search history.

(56) References Cited

U.S. PATENT DOCUMENTS

| | | | |
|---|---|---|---|
| 6,185,577 B1* | 2/2001 | Nainani | G06F 16/2358 |
| | | | 707/804 |
| 6,233,585 B1* | 5/2001 | Gupta | G06F 16/2365 |
| | | | 707/770 |
| 6,698,010 B1 | 2/2004 | Yamanouchi et al. | |
| 7,512,631 B2 | 3/2009 | Medicke et al. | |
| 8,447,745 B2 | 5/2013 | Ahuja et al. | |
| 8,548,952 B2 | 10/2013 | Weissman et al. | |
| 8,738,590 B2 | 5/2014 | Bezar et al. | |
| 8,874,593 B2 | 10/2014 | Unger et al. | |
| 8,918,361 B2 | 12/2014 | Wong et al. | |
| 8,930,322 B2 | 1/2015 | Weissman et al. | |
| 9,053,231 B2 | 6/2015 | Agrawal et al. | |
| 9,367,431 B2 | 6/2016 | Unger et al. | |
| 9,501,516 B2 | 11/2016 | Driesen | |
| 10,649,987 B2 | 5/2020 | Wong et al. | |
| 11,397,714 B2 | 7/2022 | Rielau et al. | |
| 2002/0184207 A1 | 12/2002 | Anderson et al. | |
| 2003/0115178 A1 | 6/2003 | Doole et al. | |
| 2003/0154197 A1* | 8/2003 | Millet | G06F 16/284 |
| | | | 707/769 |
| 2003/0200214 A1 | 10/2003 | Doole et al. | |
| 2005/0097149 A1* | 5/2005 | Vaitzblit | G06F 16/2358 |
| | | | 707/804 |
| 2005/0114827 A1 | 5/2005 | Lane et al. | |
| 2005/0125371 A1 | 6/2005 | Bhide et al. | |
| 2008/0086479 A1* | 4/2008 | Fry | G06F 16/27 |
| | | | 707/770 |
| 2008/0270368 A1 | 10/2008 | Cotner et al. | |
| 2010/0070480 A1 | 3/2010 | Ahuja et al. | |
| 2011/0016202 A1 | 1/2011 | Ye et al. | |
| 2013/0007069 A1* | 1/2013 | Chaliparambil | G06F 16/245 |
| | | | 707/803 |
| 2014/0025642 A1 | 1/2014 | Wong et al. | |
| 2014/0172889 A1 | 6/2014 | Adam et al. | |
| 2015/0278320 A1 | 10/2015 | Bhatnagar et al. | |
| 2017/0116321 A1 | 4/2017 | Jain et al. | |
| 2021/0342322 A1 | 11/2021 | Rielau et al. | |

OTHER PUBLICATIONS

Yoongu Kim et al., "Flipping Bits in Memory Without Accessing Them: An Experimental Study of DRAM Disturbance Errors," 2014, IEEE; pp. 361-372.

* cited by examiner

View 300

| ID | Name | Address | Email | Phone | Dist | SalesYTD |
|---|---|---|---|---|---|---|
| 1 | Ana | 123 Hwy... | ana@... | (512)... | A | $214 |
| 2 | Beto | 52 Maple... | beto@... | (214)... | B | $29 |
| 3 | Chuck | 216 Ave... | chuck@... | (713)... | C | $157 |
| 4 | Dave | 921 Calle... | dave@... | (512)... | A | $326 |
| 5 | Erin | 41B West... | erin@... | (214)... | B | $78 |
| 6 | Fiona | 68 Rue... | fiona@... | (713)... | C | $401 |
| 7 | George | 25 North... | george@... | (512)... | A | $44 |

302, 304, 306, 308, 310, 312, 314

Target Rows 322

Delete Operation 316

Post-Operation State 320

| ID | Name | Address | Email | Phone | Dist | SalesYTD |
|---|---|---|---|---|---|---|
| 1 | Ana | 123 Hwy... | ana@... | (512)... | A | $214 |
| 3 | Chuck | 216 Ave... | chuck@... | (713)... | C | $157 |
| 4 | Dave | 921 Calle... | dave@... | (512)... | A | $326 |
| 6 | Fiona | 68 Rue... | fiona@... | (713)... | C | $401 |

FIG. 3A

Old Reference Table 402

| ID | Name | Address | Email | Phone | Dist | SalesYTD |
|---|---|---|---|---|---|---|
| 2 | Beto | 52 Maple... | beto@... | (214)... | B | $29 |
| 5 | Erin | 41B West... | erin@... | (214)... | B | $78 |
| 7 | George | 25 North... | george@... | (512)... | A | $44 |

FIG. 4A

Delta Reference Table 412

| New Table Portion 414 | | | | | | | Old Table Portion 416 | | | | | | |
|---|---|---|---|---|---|---|---|---|---|---|---|---|---|
| ID | Name | Address | Email | Phone | Dist | SalesYTD | Old_ID | Old_Name | Old_Address | Old_Email | Old_Phone | Old_Dist | Old_SalesYTD |
| 1 | Ana | 123 Hwy... | ana@... | (512)... | D | $214 | 1 | Ana | 123 Hwy... | ana@... | (512)... | A | $214 |
| 4 | Dave | 921 Calle... | dave@... | (512)... | D | $326 | 4 | Dave | 921 Calle... | dave@... | (512)... | A | $326 |
| 7 | George | 25 North... | george@... | (512)... | D | $44 | 7 | George | 25 North... | george@... | (512)... | A | $44 |

FIG. 4B

Post-Operation State 320

| ID | Name | Address | Email | Phone | Dist | SalesYTD |
|---|---|---|---|---|---|---|
| 1 | Ana | 123 Hwy... | ana@... | (512)... | A | $214 |
| 3 | Chuck | 216 Ave... | chuck@... | (713)... | C | $157 |
| 4 | Dave | 921 Calle... | dave@... | (512)... | A | $326 |
| 6 | Fiona | 68 Rue... | fiona@... | (713)... | C | $401 |

Old Reference Table 402

| ID | Name | Address | Email | Phone | Dist | SalesYTD |
|---|---|---|---|---|---|---|
| 2 | Beto | 52 Maple... | beto@... | (214)... | B | $29 |
| 5 | Erin | 41B West... | erin@... | (214)... | B | $78 |
| 7 | George | 25 North... | george@... | (512)... | A | $44 |

Access Reference Table

Statement-Level INSTEAD OF Trigger 502

Trigger Instructions 504

*FIG. 5A*

Delta Reference Table 412

New Table Portion 414

| ID | Name | Address | Email | Phone | Dist | SalesYTD |
|---|---|---|---|---|---|---|
| 1 | Ana | 123 Hwy... | ana@... | (512)... | D | $214 |
| 4 | Dave | 921 Calle... | dave@... | (512)... | D | $326 |
| 7 | George | 25 North... | george@... | (512)... | D | $44 |

Old Table Portion 416

| Old_ID | Old_Name | Old_Address | Old_Email | Old_Phone | Old_Dist | Old_SalesYTD |
|---|---|---|---|---|---|---|
| 1 | Ana | 123 Hwy... | ana@... | (512)... | A | $214 |
| 4 | Dave | 921 Calle... | dave@... | (512)... | A | $326 |
| 7 | George | 25 North... | george@... | (512)... | A | $44 |

Access Reference Table → Statement-Level INSTEAD OF Trigger 506

Trigger Instructions 508

Post-Operation State 326

| ID | Name | Address | Email | Phone | Dist | SalesYTD |
|---|---|---|---|---|---|---|
| 1 | Ana | 123 Hwy... | ana@... | (512)... | D | $214 |
| 2 | Beto | 52 Maple... | beto@... | (214)... | B | $29 |
| 3 | Chuck | 216 Ave... | chuck@... | (713)... | C | $157 |
| 4 | Dave | 921 Calle... | dave@... | (512)... | D | $326 |
| 5 | Erin | 41B West... | erin@... | (214)... | B | $78 |
| 6 | Fiona | 68 Rue... | fiona@... | (713)... | C | $401 |
| 7 | George | 25 North... | george@... | (512)... | D | $44 |

Storing trigger information associated with a statement-level database trigger executable to initiate execution of at least one trigger instruction for a database instead of performing a particular database operation, on a first target arrangement, into rows and columns, of data from the database, specified by a database operation statement
610

↓

Receiving a first database operation statement specifying performance of the particular database operation on the first target arrangement
620

↓

Identifying a set of first target rows, within the first target arrangement, targeted by the first database operation statement
630

↓

Generating a first reference table associated with the first target arrangement, wherein the first reference table includes rows corresponding to the first target rows
640

↓

Executing the statement-level database trigger instead of executing the first database operation statement, wherein executing the statement-level database trigger includes accessing the first reference table
650

*FIG. 6*

STATEMENT-LEVEL INSTEAD-OF DATABASE TRIGGERS

BACKGROUND

Technical Field

This disclosure relates generally to database systems and, more specifically, to implementing a statement-level INSTEAD OF database trigger.

Description of the Related Art

Modern database systems routinely enable users to store a collection of information as a database that is organized in a manner that can be efficiently accessed and manipulated. Those systems often store at least a portion of that information in database tables that are composed of columns and rows in which a column corresponds to a field defining a grouping of that information and a row stores a record within the table. During its operation, a database system can perform database transactions or operations that involve reading and/or writing information with respect to the database. For example, when new information is being inserted into the database, the database system may insert that information as a set of records in a database table. An operation on a database may be defined with respect to a particular database table, or in some cases a database view, which is a virtual table defined by a query of the database. A view may be used to form a kind of customized table combining selected portions of multiple database tables.

In some cases, in connection with performing an operation on a database table or view (e.g., by inserting records), the system executes additional routines with respect to that table or view. Some such routines are called database triggers, which are "triggered" to execute by a particular database operation. A database trigger can be defined to run before, after or instead of the database operation. For example, an INSTEAD OF trigger in Structured Query Language (SQL) is often used for an operation specified for a database view instead of a table. Because a view is a virtual table defined by a query, views are in some cases not directly modifiable by operations such as insert, delete or update. An INSTEAD OF trigger includes instructions that are executed instead of the statement specifying an operation on a view. In some cases, the trigger instructions may be designed to perform operations allowed by a database's management system, such as operations on tables, that serve to bring about the intended effect of a specified operation on a database view, even if performing of the operation directly on the database view is not allowed by the database management system.

BRIEF DESCRIPTION OF THE DRAWINGS

FIGS. 3A-3B illustrate examples of intended operations on a database view, according to some embodiments.

FIGS. 4A-4B are tables representing examples of reference tables used by a statement-level database trigger defined to operate instead of the operations of FIGS. 3A-3B, according to some embodiments.

FIGS. 5A-5B illustrate example trigger execution scenarios corresponding to the operations of FIGS. 3A-3B and tables of FIGS. 4A-4B, according to some embodiments.

FIGS. 6-7 are flow diagrams illustrating example methods relating to execution of a statement-level database trigger, according to some embodiments.

DETAILED DESCRIPTION

Figure 1:
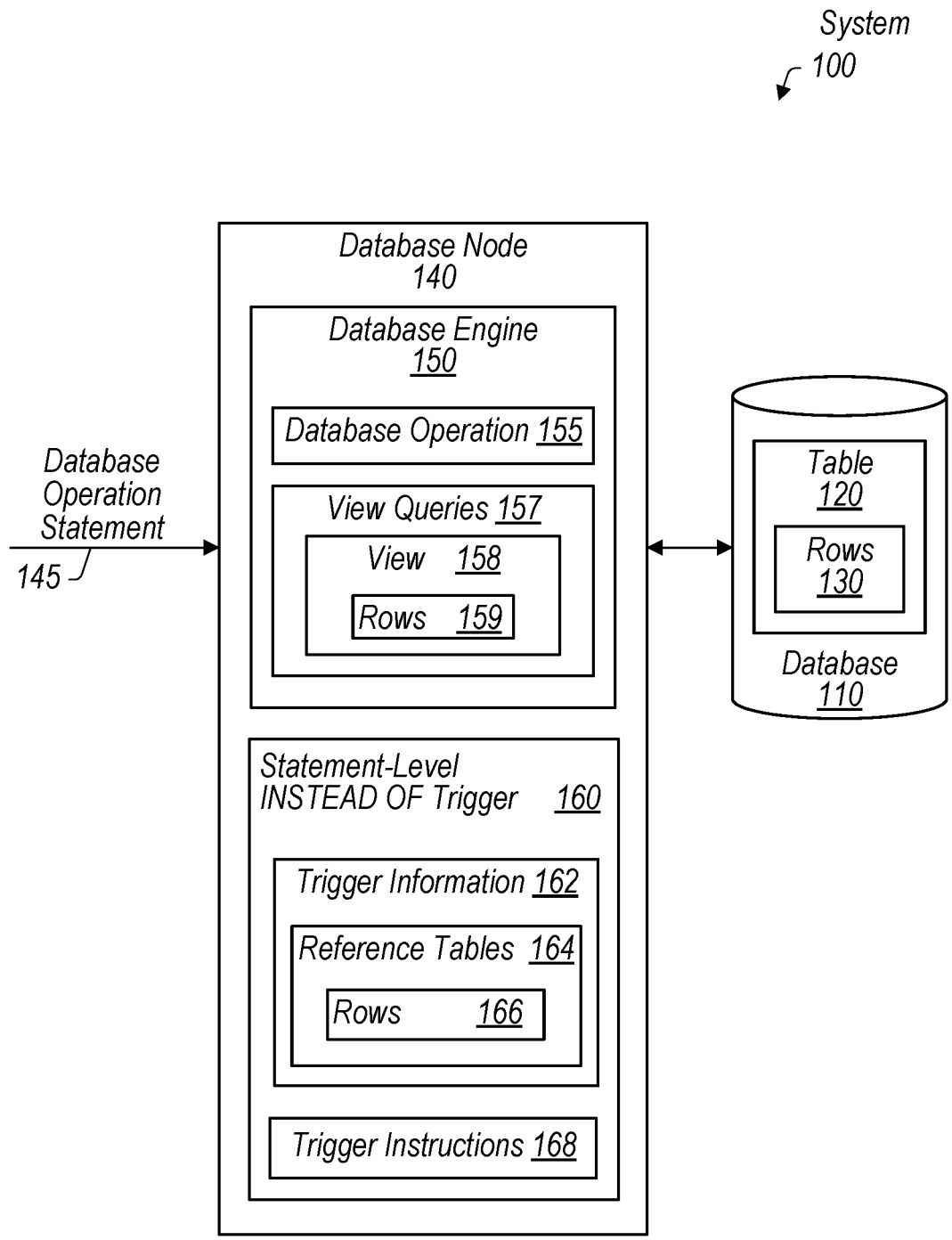
FIG. 1 is a block diagram illustrating example elements of a system including a database and a database node storing database trigger information, according to some embodiments.

In many cases, a database system allows for database triggers to be defined, stored, and then executed by the database system. As used herein, the phrase "database trigger" (or simply "trigger") is used in accordance with its well-understood meaning and refers to procedural code that is executed in connection with a certain event (herein referred to as the "trigger event") that occurs at a database system. For example, a user can define a trigger that performs auditing on rows of a database table that have been updated as a part of the database system executing an update operation, such as a Structured Query Language (SQL) UPDATE statement, on the database table.

Database triggers can be defined to run at various times in connection with the timing of the trigger event. For example, a trigger performing auditing of updated rows as mentioned above may run after the update operation that serves as the trigger event. Such a trigger may be referred to as an AFTER trigger herein. As another example, a trigger may be defined to adjust an updated record before it is written to the stored version of the database (writing to the stored version may be referred to as "writing to disk" regardless of the specific media used in storing a database). This type of trigger runs before completion of the trigger event operation and may therefore be referred to as a BEFORE trigger.

Another type of trigger timing is implemented by an INSTEAD OF trigger. Rather than running either before or after execution of a trigger event such as an update operation, an INSTEAD OF trigger runs instead of execution of the trigger event. In some embodiments INSTEAD OF triggers are allowed only when the trigger event is an operation on a database view rather than a database table. As noted above, a database view is a virtual table defined by a query, where the particular arrangement of rows and columns in the view is not stored as part of the database. For example, a view may be formed using a query that selects some columns from one database table and other columns from a different database table, then puts the columns together to form a view containing records that include both sets of columns. Such a view may not be directly modifiable by a statement specifying, say, deletion of certain rows of the view, since the view is not included in the stored version of the database. An INSTEAD OF trigger can be defined for the trigger event of an operation on a database view. In an embodiment, execution of the trigger instructions instead of execution of a statement specifying the operation on the view may cause the underlying tables of the view to be modified in a way that causes the view to reflect the specified operation. In other embodiments, execution of the trigger instructions may bring about the intended effect of the specified operation on the view in a different way, such as by altering a definition of rows or columns selected to form the view. In still other embodiments, an INSTEAD OF trigger may be defined to carry out operations that do not bring about the intended effect of the specified operation on the database view. Use herein of phrases such as BEFORE, AFTER, or INSTEAD OF is not intended to limit the disclosure herein to SQL implementations. This disclosure is also believed to apply to other implementations of triggers having the disclosed properties.

In addition to variations in database trigger timing such as those described above, database triggers can be defined in various ways with regard to frequency of trigger firing. For example, triggers may in some embodiments be defined to fire on a per-row basis, meaning that a defined trigger executes for each row of the table or view targeted by the trigger event in the definition of the trigger. In an embodiment, a trigger defined to run on a per-row basis in connection with, for example, an update operation on a database has access to virtual (not yet written to the stored version of the database) "old" and "new" values of the row being updated. "Old values" as used herein refers to values present before the trigger event, while "new values" refers to values present after the trigger event. These old and new values are used, as appropriate, to execute the trigger instructions, or procedure, established for the trigger.

In another option for trigger firing frequency, triggers may be defined to fire on a per-statement basis, so that the trigger fires once in connection with each statement specifying the trigger event, no matter how many rows may be affected by the trigger event. In various embodiments, triggers defined to fire on a per-statement basis (also referred to as statement-level triggers herein) have access to one or more reference tables that may be referred to as transition tables. A reference table may include old values for rows affected by the trigger event, new values for these rows, or a combination of both. For example, an "old" reference table, or old transition table, accessed by a statement-level trigger defined for a delete operation may include the rows specified to be deleted, where the data in these rows is "old" data corresponding to before the delete operation. As another example, a "new" reference table, or new transition table, accessed by a statement-level trigger defined for an insert operation may include the rows specified to be inserted, where the data in these rows is "new" data corresponding to after the insert operation. In an embodiment of a statement-level trigger defined for an update operation, reference tables including both "old" and "new" data may be accessed by the trigger. These reference tables may be in the form of separate old and new tables, or as a combined table, which may be referred to as a "delta" table, having both old and new data. Reference tables for use by statement-level triggers are typically built during execution of the trigger event.

Existing INSTEAD OF triggers are defined to fire on a per-row basis. Firing a trigger on a per-row basis can require significantly more processor time than firing the same trigger on a per-statement basis, impacting the overall efficiency of database operations with respect to metrics including speed, power usage, and system resources such as memory and registers. This inefficiency may become more severe the more rows are modified by a given trigger event. As just one example, an operation on a database view of a large organizational database could affect hundreds of thousands of rows, with an INSTEAD OF trigger defined for that operation firing for each affected row. It could therefore improve database system operation if a statement-level INSTEAD OF trigger could be used.

The present disclosure describes implementation of a statement-level INSTEAD OF trigger. In various embodiments described below, a system includes a database and a database node that reads and writes data with respect to the database. The database node may store trigger information identifying a statement-level trigger having a set of instructions to be executed instead of a particular operation being performed on a database view. The node may then execute the statement-level trigger instead of executing the database operation statement. In an embodiment, when the database node receives a database operation statement specifying performance of the particular operation on the database view, the node identifies a set of rows in the database view that are targeted by the particular operation. The node generates one or more reference tables that include rows corresponding to the targeted rows of the database view. In an embodiment, executing the statement-level database trigger includes accessing at least one of the one or more reference tables. By contrast to existing procedures of creating reference tables for statement-level triggers, creation of reference tables for statement-level INSTEAD OF triggers as described herein is not done while executing the particular operation on the stored version of the database. In an embodiment, the reference tables for statement-level INSTEAD OF triggers are created without altering the stored version of the database.

In some embodiments, a statement-level INSTEAD OF trigger as disclosed herein is defined to not rely on data in a reference table. For such a trigger, no reference tables are generated, and no reference tables are accessed during execution of the trigger. In an embodiment, whether a reference table is generated for a statement-level INSTEAD OF trigger depends on whether the definition for the trigger includes a clause referencing a table.

Use of statement-level INSTEAD OF triggers as described herein may allow significant database performance improvement for operations involving INSTEAD OF triggers, such as many operations on database views. Example applications of the disclosed embodiments are discussed below, starting with reference to FIG. 1.

FIG. 1 is a block diagram of a system 100 including a set of components that may be implemented via hardware or a combination of hardware and software routines. Within the illustrated embodiment, system 100 includes a database 110 and a database node 140 coupled to database 110. As further shown, database 110 includes a table 120 having rows 130, and database node 140 includes a database engine 150 and a statement-level INSTEAD OF trigger 160. Also as shown, database engine 150 executes a database operation 155 which may be specified by a received database operation statement 145. Database engine 150 also executes view queries 157 to form database views such as view 158 having rows 159. In some embodiments, system 100 is implemented differently than depicted. For example, system 100 might include multiple database nodes 140 and a database node may store multiple statement-level INSTEAD OF triggers 160 for database 110. As further examples, database 110 may store other database objects (e.g., indexes) and database node 140 may include other types of database triggers in addition to statement-level INSTEAD OF trigger 160.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, database node 140 and database 110 may utilize the available cloud resources of the cloud infrastructure (e.g., computing resources, storage resources, network resources, etc.) to facilitate their operations. For example, database node 140 may execute in a virtual environment that is hosted on server-based hardware included in a datacenter of a cloud provider. But in some embodiments, system 100 is implemented utilizing a local or private infrastructure as opposed to a public cloud.

Database 110, in various embodiments, is a collection of information that is organized in a manner that allows for access, storage, and/or manipulation of that information. Database 110 may include supporting software (e.g., storage servers) that enables database node 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In some embodiments, data written to database 110 by database node 140 is accessible to other database nodes 140 in a multi-node configuration. In various embodiments, data is stored at database 110 in records that are associated with database tables, such as table 120.

Table 120, in various embodiments, is a database object having a set of data records, where that set of data records may be an empty set. Table 120 may store data in an organized structure arranged into rows and columns, where a column corresponds to a field and a row 130 corresponds to a record that includes one or more values for the columns. A field, in various embodiments, provides structure for table 120 and defines a category of data for which rows 130 of table 120 may provide a value. For example, a field might correspond to usernames and thus a row 130 of table 120 may include a username value for that field/column. In various embodiments, table 120 stores data for multiple users/tenants. Thus, table 120 can include a field/column defining "tenant" as a subset of data under which each row specifies a tenant that corresponds to the record represented by that row. While database tables are discussed herein as components of database 110, in some embodiments other database objects may be used, such as a document in a non-relational database.

Database node 140, in various embodiments, provides database services, such as data storage, data retrieval, and/or data manipulation. In various embodiments, database node 140 is software that is executable on hardware, while in some embodiments, it encompasses both the hardware and the software. The database services may be provided to other components in system 100 or to components external to system 100. As shown, database node 140 can receive a database operation statement 145 requesting that node 140 perform a database operation 155. Database operation statement 145 may be received from an application node (not illustrated) via an established database connection, for example. Some examples of a database operation 155 could include SQL INSERT, DELETE, or UPDATE operations. A database operation statement specifying such an operation may specify one or more rows of a database table or view to be inserted, deleted or updated via the operation. Database view queries 157 may also be requested via a database operation statement such as statement 145. As an example, a view query 157 may select values from a first set of columns from a first database table 120 and values from a second set of columns from a second database table 120 and combine those values to create a view 158 with rows 159 storing records having fields corresponding to both sets of columns. Rows 159 of such a view may therefore include values for a different set of fields than those included in any one database table 120. Example database view embodiments are described further below in connection with FIGS. 3A and 3B.

Database engine 150, in various embodiments, is software that is executable to provide the database services of database node 140, including carrying out database operations 155 and view queries 157. In various embodiments, database engine 150 processes database operations 155 and view queries 157 in accordance with a set of guiding principles that ensure transactional consistency. One example of a set of guiding principles is ACID (Atomicity, Consistency, Isolation, and Durability). In various embodiments, in connection with performing a database operation 155, database engine 150 executes a set of user-defined procedures to implement desired functionality. In particular, database node 140 may access a definition of a user-defined procedure, compile it into an executable form, and then execute it. One example of such a procedure is a database trigger such as statement-level INSTEAD OF trigger 160. In some embodiments compiled user-defined procedures such as database triggers may be considered to be part of the database engine 150.

A database trigger, in various embodiments, is a set of one or more software routines executable to perform a set of one or more actions in connection with a particular trigger event corresponding to a particular table 120 or view 158. For example, a database trigger 160 for table 120 may execute in response to database node 140 executing a Data Manipulation Language (DML) operation on table 120 as a database operation 155. In various embodiments, a database trigger 160 may be defined in a definition (e.g., a block of code) that is provided to system 100 by a user and then compiled into an executable form. As noted above, a database trigger may be defined to execute in various ways with respect to execution of a trigger event, such as before, after or instead of the trigger event. Statement-level INSTEAD OF trigger 160 of FIG. 1 is defined to execute instead of a specified trigger event and is defined to fire per-statement rather than per-row.

As illustrated in FIG. 1, Statement-level INSTEAD OF trigger 160 includes trigger information 162 and trigger instructions 168. Trigger information 162 includes a set of one or more reference tables 164 having rows 166. Reference tables 164 are accessed during execution of trigger 160. In the embodiment of FIG. 1, reference tables 164 are stored at database node 140 and are not a part of database 110. In an embodiment, rows 166 of reference tables 164 correspond to rows of a view or table targeted by the trigger event of trigger 160. For example, if the trigger event that trigger 160 is defined for is a delete operation for deleting a particular set of rows from a particular database view 158, rows in the particular set of rows are referred to herein as rows targeted by the trigger event, or "target rows." Rows 166 in a reference table 164 correspond to the target rows. In an embodiment for which the trigger event is a delete operation, reference table 164 may be an "old" reference table storing data reflecting the records stored in the target rows prior to execution of the delete operation. As another example, if the trigger event is an insertion of certain rows into a database view, the certain rows to be inserted are target rows for the trigger event. Reference table 164 in such an embodiment may be a "new" reference table storing data from these target rows to be inserted. In another example in which the trigger event is an update affecting particular rows of a database view, the particular rows affected are target rows for the trigger event. In some embodiments, reference tables 164 in the case of an update operation may include separate "old" and "new" reference tables including old values and new values for records in the target rows. In other embodiments, reference tables 164 may include a single delta table including both old and new values for records in the target rows. Example reference table embodiments are described further below in connection with FIGS. 4A-4B.

In an embodiment, reference tables 164 are generated in response to receiving a database operation statement 145 specifying a database operation that corresponds to a trigger event for a statement-level INSTEAD OF trigger 160 stored at database node 140. The generated tables are used to execute the trigger 160 for that statement. In an embodiment, reference tables 164 are temporary tables associated with the database operation statement causing them to be generated. Data structures for storing reference tables 164 are therefore reset, in various embodiments, after the execution of all statement-level INSTEAD OF triggers 160 in connection with the database operation statement has completed. In an embodiment, generating the one or more reference tables includes determining what type of reference table or tables (such as old, new and/or delta reference table) is needed, based on the particular trigger event. Generating reference tables 164 may also include identifying rows of the view or table targeted by the database operation statement that are targeted by the statement. As used herein, a row is said to be "targeted" or a "target row" if execution of the database operation statement would affect that row, such as by inserting the row, deleting it, or updating it.

Trigger instructions 168 include one or more instructions executed when that trigger 160 is executed, or "fired." Trigger instructions 168 may include a function or "procedure" written to implement the trigger. For an INSTEAD OF trigger such as statement-level INSTEAD OF trigger 160, trigger instructions 168 include instructions to be executed instead of executing the database operation statement 145 causing the INSTEAD OF trigger to fire. For example, if the database operation statement specifies an operation performed on a database view, trigger instructions 168 may implement operations causing the database view to reflect the effects of the specified operation, without directly modifying the database view. Such operations may include operations on underlying tables that the database view is selected from, in some embodiments. Trigger instructions 168 may implement other substitute operations for the database operation statement in other embodiments.

In an embodiment, execution of trigger instructions 168 involves accessing one or more of reference tables 164. The ability to access all affected rows, via reference tables 164, using one trigger execution, rather than executing a row-level trigger for each modified row may provide significant performance improvements. As an example, trigger instructions related to repeatedly calling a function to execute the row level trigger can be avoided in the statement-level implementation. In an embodiment, if multiple statement-level INSTEAD OF triggers 160 are defined for a given statement and targeted database view or table, these triggers will all access the same reference tables 164 during execution. If an additional statement-level INSTEAD OF trigger is defined for an operation on a different view or table, however, execution of the additional trigger involves accessing one or more reference tables from a different set of reference tables associated with the different view or table. In an embodiment, one statement specifying operation on multiple views results in generation of multiple sets of reference tables to support execution of statement-level INSTEAD OF triggers defined for the multiple views. Example elements of a database trigger 160 are discussed in greater detail with respect to FIG. 2.

Figure 2:
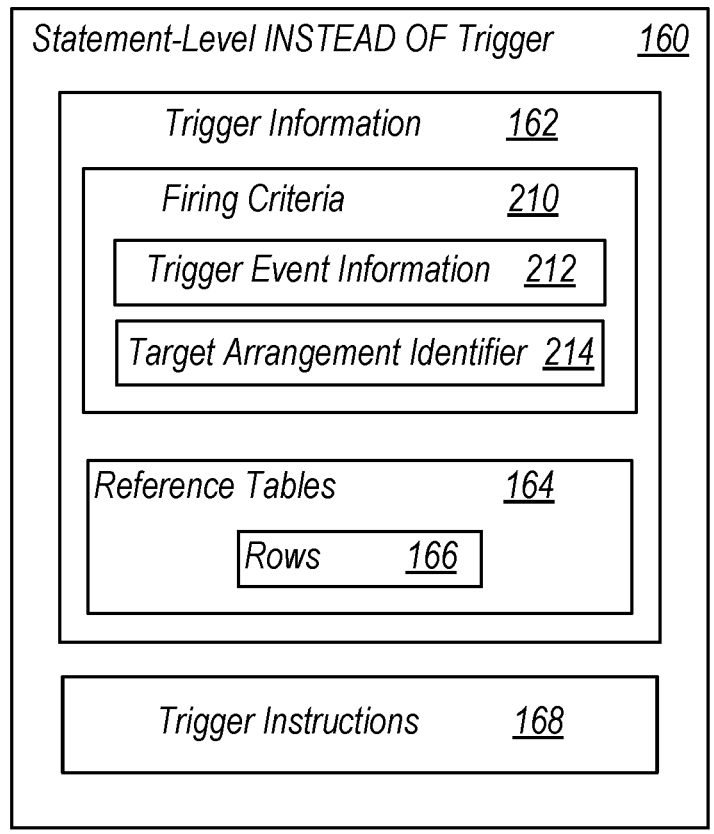
FIG. 2 is a block diagram illustrating example elements of a statement-level INSTEAD OF database trigger, according to some embodiments.

Turning now to FIG. 2, a block diagram showing additional elements of an example statement-level INSTEAD OF trigger 160 is depicted. As also shown in FIG. 1, statement-level INSTEAD OF trigger 160 includes trigger information 162 and trigger instructions 168. Trigger instructions 168 are described above in connection with FIG. 1, while trigger information 162 includes additional elements as compared to the embodiment of FIG. 1. In the embodiment of FIG. 2, trigger information 162 includes firing criteria 210 in addition to reference tables 164. Reference tables 164 are described above in connection with FIG. 1. Firing criteria 210 includes information used to determine whether statement-level INSTEAD OF trigger 160 should be fired in connection with a received database operation statement. In an embodiment, firing criteria 210 includes information received by database node 140 in a trigger definition for trigger 160.

In an embodiment, a trigger definition includes information such as a name for a trigger, an indicator of timing such as BEFORE, AFTER of INSTEAD OF, and indicators of a database operation that the trigger is defined for and a target table or view that the database operation is directed to. A trigger definition may further include a frequency element indicating whether the trigger is to run on a per-row or per-statement basis and a procedure name identifying a specific set of trigger instructions to be executed when the trigger fires. In various embodiments, a trigger definition also includes reference data identifiers of data accessed during execution of the trigger instructions. In the case of a per-row trigger, such reference data identifiers may identify virtual "old" and "new" rows generated by the database node for each row of a target table or view affected by a database operation statement. In the case of a per-statement trigger, the reference data identifiers may identify one or more reference tables such as reference tables 164. In various embodiments, reference tables are identified using a clause in a trigger definition beginning with "REFERENCING" and followed by definitions for one or more of an "OLD TABLE," "NEW TABLE" or "DELTA TABLE". Other language and syntax may be used to identify reference tables in other embodiments. In some embodiments, statement-level INSTEAD OF triggers as disclosed herein may be defined without including reference table identifiers (for example, without a "REFERENCING . . . " clause in the trigger definition. Such triggers execute without accessing reference tables.

In the embodiment of FIG. 2, firing criteria 210 includes trigger event information 212 and target arrangement identifier 214. Trigger event information 212, in various embodiments, identifies a database event involved in triggering the execution of trigger instructions 168. Database events can generally include, for example, the execution of DML operations (e.g., SQL UPDATE), Data Definition Language operations (e.g., SQL RENAME), Data Control Language operations (e.g., SQL REVOKE), etc. In some embodiments, database events for statement-level INSTEAD OF trigger 160 may include operations such as insert, delete, update or truncate operations. As an example, trigger 160 might be triggered in response to the execution of an SQL INSERT or DELETE operation. In some cases, multiple trigger events may be defined for database trigger 160 and included in trigger event information 212. In various embodiments, trigger event information 212 also identifies trigger 160 as an INSTEAD OF trigger and/or a statement-level trigger.

Target arrangement identifier 214, in various embodiments, identifies an arrangement of rows and columns that is associated with a trigger event identified by trigger event information 212. The arrangement, which may also be referred to as herein as a "relation," may in various embodiments be a database view such as view 158 of FIG. 1 or a database table such as table 120 of FIG. 1. As an example, target arrangement identifier 214 might identify a database view 158. In such an example, trigger instructions 168 are executed based on specification in a database operation statement of a trigger event in relation to that view 158, where the trigger event is identified in trigger event information 212.

Turning now to FIG. 3A, a block diagram is shown illustrating an example of an operation on a database view that may be specified by a database operation statement. In an embodiment, the view illustrated in FIG. 3A is not directly modifiable using a database operation statement in the way that a database table such as table 120 of FIG. 1 would be. The transformation illustrated in FIG. 3A of database view 300 to a post-operation state 320 via a delete operation 316 can therefore be viewed as an operation intended or specified by a database operation statement specifying update operation 316 on view 300, and not necessarily as a result of an actual execution of such a database operation statement. In various embodiments, one or more statement-level INSTEAD OF triggers may be defined to run instead of execution of the database operation statement that specifies the behavior illustrated in FIG. 3A. In cases where such statement-level INSTEAD OF triggers are defined as using reference tables, the reference tables are built based on this specified behavior.

View 300 represents an example of a view 158 formed from database 110 by database node 140, as shown in FIG. 1. As illustrated, view 300 includes seven fields corresponding to columns of the view and seven rows corresponding to seven different records formed by selection from tables of a database such as database 110. In this example, field 302 (corresponding to column heading "ID") is a customer identifier field, with values of 1 through 7. Field 304 is a customer name field, field 306 an address field, field 308 an email field, and field 310 a phone number field. Field 312 (corresponding to column heading "Dist") identifies a distributor for the customer, while field 314 is for year-to-date sales to the customer. In various embodiments, view 300 may be generated using a query that combines fields selected from different tables of a database. For example, fields 306, 308 and 310 may be drawn from a first database table in one embodiment, while fields 312 and 314 are drawn from a second database table, where both tables include fields 302 and 304. In other embodiments formation of view 300 may involve additional modification of data selected from multiple database tables or other objects. View 300 is a simplified example for purposes of explanation; actual database views that techniques disclosed herein are applicable to may be much more complex and contain, for example, orders of magnitude more rows and columns than view 300.

In the scenario illustrated in FIG. 3A, a database operation statement (not shown) such as database operation statement 145 of FIG. 1 specifies a delete operation 316 to be performed on view 300. In this example, performance of operation 316 on view 300 results in a post-operation state 320 of view 300. It can be seen from post-operation state 320 that performance of delete operation 316 causes three rows to be deleted from view 300 (the rows corresponding to ID field values 2, 5, and 7). In an embodiment, the database operation statement including delete operation 316 includes a condition selecting these three rows for deletion. One example of such a condition could be a condition causing rows to be deleted for which the value in field 314 is less than $100. The three rows of view 300 affected by delete operation 316, or by the database operation statement specifying operation 316, are identified as target rows 322. The target rows as used herein are the rows affected by performance of a given database operation statement.

Figure 3B:
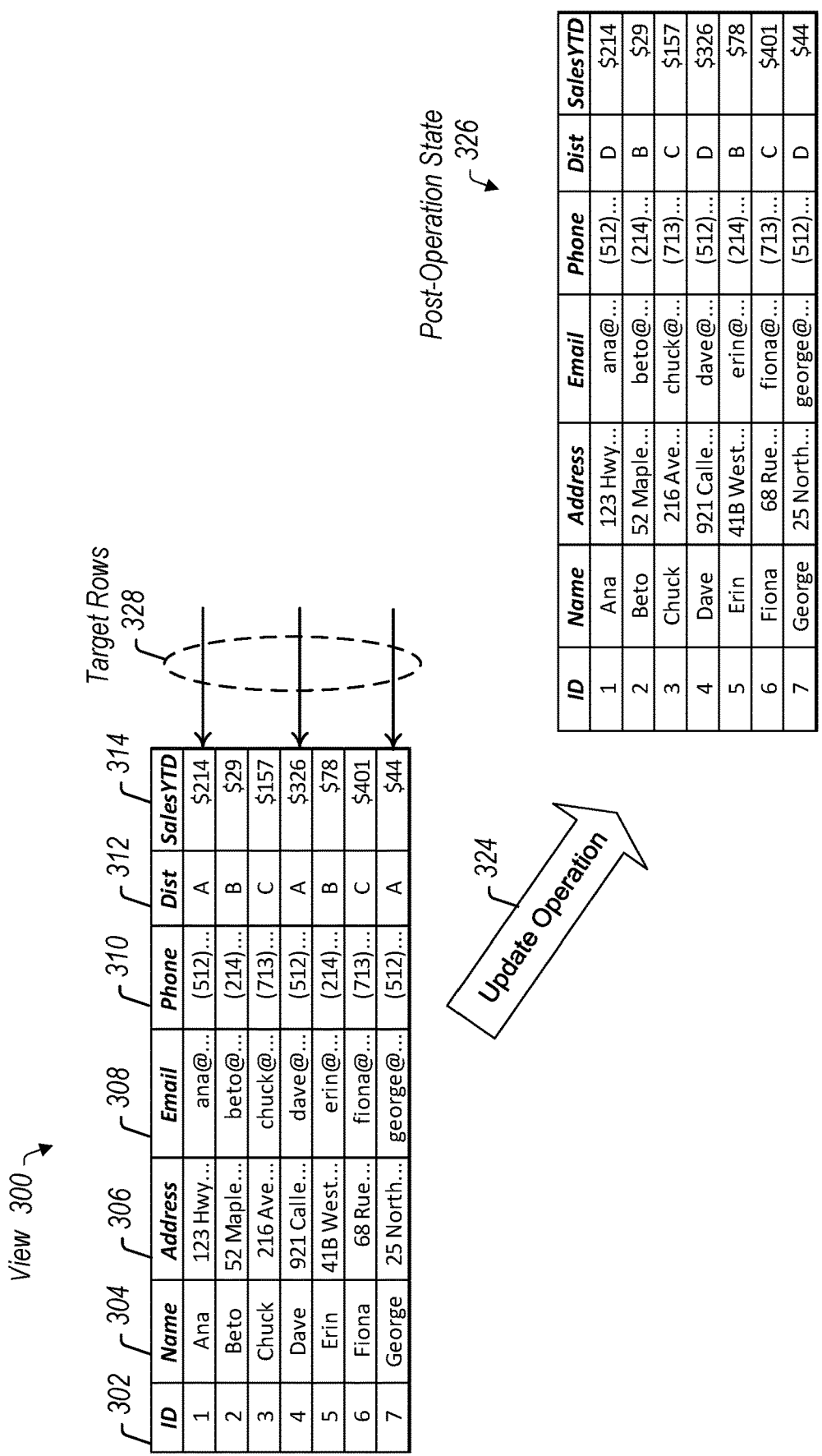

FIG. 3B illustrates another example of an operation on a database view that may be specified by a database operation statement. In the example of FIG. 3B, a database operation statement (not shown) specifies an update operation 324 to be performed on view 300. As shown, performance of operation 324 results in a post-operation state 326 of view 300. It can be seen from post-operation state 326 that performance of update operation 324 causes distributor field 312 to be updated for three rows of view 300 (the rows corresponding to ID values 1, 4 and 7). In an embodiment, the database operation statement including update operation 324 includes a condition selecting these three rows for updating. One example of such a condition could be a condition causing an update to the distributor for rows having an area code of 512 in phone number field 310. In a similar manner as for target rows 322 in the scenario of FIG. 3A, the rows affected by performance of operation 324 are labeled as target rows 328 in FIG. 3B. The scenarios of FIGS. 3A and 3B are simplified examples for purposes of explanation. In various embodiments, different operations may be specified in a database operation statement for performance on a database view or other target arrangement. Such operations may include, for example, insert operations, truncate operations, or other operations for which an INSTEAD OF trigger is desired.

FIGS. 4A and 4B illustrate examples of reference tables 164 that may be generated by a database node 140 for use by a statement-level INSTEAD OF trigger defined to be executed instead of the operations of FIGS. 3A and 3B. In FIG. 4A, "old" reference table 402 may be generated in connection with a trigger defined to operate instead of delete operation 316 of FIG. 3A. In an embodiment, generation of a reference table such as table 402 includes determining what type of reference table is needed for a particular database operation statement. Such a determination may include selecting an "old" reference table for an INSTEAD OF trigger based on delete operation 316 of FIG. 3A, since performance of the delete operation would not result in any "new" data for the target rows. In some embodiments, determination of the type of reference table is based on a table naming convention used in a trigger definition for the INSTEAD OF trigger. Generation of table 402 may further include identifying rows of view 300 that are targeted by the database operation statement corresponding to FIG. 3A. In an embodiment, identifying targeted rows includes evaluating any conditions included in the database operation statement to identify rows targeted by the statement. In various embodiments, rows in reference tables 164 correspond to the target rows. In the example of FIG. 4A, rows in old reference table 402 correspond to target rows 322 of FIG. 3A. In this case, the rows of table 402 have the same data as target rows 322, because table 402 is an "old" reference table storing pre-operation data.

In FIG. 4B, delta reference table 412 may be generated in connection with a trigger defined to operate instead of update operation 324 of FIG. 3B. In an embodiment, generation of reference table 412 includes selection of a delta table structure based on the existence of both "old" and "new" data in connection with an update operation such as operation 324. In other embodiments, separate "old" and "new" reference tables could be generated instead of delta reference table 412. In a similar way to that discussed above in connection with FIG. 3A, generation of table 412 may further include identifying rows of view 300 that are targeted by the database operation statement corresponding to FIG. 3B. In the embodiment of FIG. 4B, the rows of table 412 correspond to target rows 328 of FIG. 3B. Delta reference table 412 includes a "new" table portion 414 containing updated data that would result from performing update operation 324 on view 300 and an "old" table portion 416 containing pre-operation data from view 300. The rows of table 412 therefore include both the pre-operation data and post-operation data from their corresponding target rows in view 300. In the embodiment of FIG. 4B, column headings in old table portion 416 are altered to include "Old_" in the name to distinguish the old data columns from the new data columns. Table 412 represents merely an example, and delta reference tables may be arranged in other ways and/or use other column naming conventions in other embodiments.

FIGS. 5A and 5B illustrate example trigger execution scenarios using the reference tables of FIGS. 4A and 4B in connection with the operations of FIGS. 3A and 3B. Turning to FIG. 5A, old reference table 402 is shown being accessed by a statement-level INSTEAD OF trigger 502. Trigger 502 is an example of a statement-level INSTEAD trigger 160, in this case defined to execute instead of delete operation 316 of FIG. 3A. In the example of FIG. 5A, firing of trigger 502 causes trigger instructions 504 to be executed, resulting in a change of view 300 into post-operation state 320. In various embodiments, trigger instructions 504 may bring about post-operation state 320 of view 300 by performing operations on underlying database tables 120 that view 300 is selected from, by modifying view queries used to form view 300, or by other suitable means.

FIG. 5B illustrates delta reference table 412 being accessed by statement-level INSTEAD OF trigger 506. Trigger 506 is an example of a statement-level INSTEAD trigger 160, in this case defined to execute instead of update operation 324 of FIG. 3B. In the example of FIG. 5B, firing of trigger 506 causes trigger instructions 508 to be executed, resulting in a change of view 300 into post-operation state 326. In various embodiments, trigger instructions 508 may bring about post-operation state 326 of view 300 by performing operations on underlying database tables 120 that view 300 is selected from, by modifying view queries used to form view 300 or by other suitable means. It is noted that triggers 502 and 506 are merely examples; other embodiments of statement-level INSTEAD OF triggers do not include trigger instructions executable to bring about an implementation of the operation, on the database view, specified in the database operation statement causing the trigger to fire. Statement-level INSTEAD OF triggers may be designed in various embodiments to implement any operations allowed by a management system of the database in connection with a database operation statement meeting the trigger's firing criteria. In some embodiments these functions may not involve implementing the operation specified by the database operation statement.

Turning now to FIG. 6, a flow diagram of a method 600 is shown. Method 600 is one embodiment of a method performed by a computer system (e.g., system 100, a database node 140, etc.) to execute a statement-level INSTEAD OF database trigger. Method 600 may be performed by executing program instructions stored on a non-transitory computer-readable medium. In some embodiments, method 600 can include more or fewer blocks than shown. For example, method 600 may also include receiving trigger information from a user in some embodiments. Receiving trigger information may include receiving a trigger definition in various embodiments.

Method 600 includes, at block 610, storing trigger information associated with a statement-level database trigger. The statement-level database trigger is executable to initiate execution of at least one trigger instruction for a database instead of performing a particular database operation, on a first target arrangement, into rows and columns, of data from the database, specified by a database operation statement. Statement-level database triggers 160, 502 and 506 are examples of the statement-level database trigger. Trigger instructions 168, 504 and 508 are examples of the at least one trigger instruction. Database operation 155, delete operation 316 and update operation 324 are examples of a particular database operation specified by a database operation statement. In various embodiments, the particular database operation specified by a database operation statement is an insert operation, a delete operation, an update operation or a truncate operation. The particular database operation may include other operations in other embodiments. Database operation statement 145 is an example of a database operation statement. In an embodiment, the first target arrangement is a database view. The first target arrangement may include a database table or other arrangement of data in other embodiments.

The storing of trigger information in block 610 may in some embodiments be performed by a database node in connection with analysis of a trigger definition provided by a user of the database. The stored trigger information may include, for example, trigger firing criteria such as identifiers of the particular database operation and the target arrangement. The trigger information may also include indicators that the trigger is a statement-level trigger and an INSTEAD OF trigger. The stored trigger information may also include identifiers for reference tables generated for use during trigger execution, as discussed further below.

Method 600 further includes receiving, at block 620, a first database operation statement specifying performance of the particular database operation on the first target arrangement. Information in the received first database operation statement therefore matches at least a portion of the stored trigger information for the statement-level database trigger. In other embodiments, method 600 may also include analyzing the first database operation statement to determine that the specified database operation and target arrangement in the statement match those in the trigger information. As shown, method 600 further includes, at block 630, identifying a set of first target rows, within the first target arrangement, targeted by the first database operation statement. Target rows 322 and 328 are examples of rows targeted by the database operation statements for the scenarios of FIGS. 3A and 3B, respectively. In an embodiment, identifying the first set of target rows includes evaluating one or more conditions within the first database operation statement.

In addition, method 600 includes, at block 640, generating a first reference table associated with the first target arrangement, where the first reference table includes rows corresponding to the first target rows. Reference tables 402 and 412 are examples of a reference table. In some embodiments for which the first reference table includes updated data, generating the first reference table includes performing the particular database operation on data from the identified target rows, without writing updated data to the stored version of the database. Although the identifying of block 630 and generating of block 640 are illustrated separately, the identifying of block 630 may not necessarily be completed before the generating of block 640 begins. In some embodiments, for example, a first row corresponding to a first target row may be written to the reference table as the first target row is identified, followed by identifying a second target row and writing its corresponding row to the reference table, and so on.

In an embodiment, generating the first reference table includes determining a type of reference table to be generated. In some embodiments, a type of reference table is specified in a trigger definition for the first statement-level database trigger. A table identifier from a trigger definition may in some embodiments be included in trigger information stored in connection with block 610 of method 600. In some embodiments, determining a type of reference table may be based on the particular database operation. For example, an "old" reference table may be generated if the particular database operation is a delete operation, while a "new" reference table may be generated if the particular database operation is an insert operation. If the particular database operation is an update operation, a set of reference tables including both old and new reference tables may be generated in some embodiments. In other embodiments, a delta reference table is generated when the particular database operation is an update operation. In some embodiments, a set of reference tables including both pre-operation and post-operation data is generated without regard for the particular database operation.

Method 600 further includes, at block 650, executing the statement-level database trigger instead of executing the first database operation statement, where executing the statement-level database trigger includes accessing the first reference table. In an embodiment, executing the statement-level database trigger includes executing the at least one trigger instruction. Executing an INSTEAD OF trigger once per statement as implemented by method 600 may provide database performance improvements over use of row-level INSTEAD OF triggers.

In further embodiments, method 600 may include storing trigger information associated with an additional statement-level database trigger defined for the same target arrangement. In such an embodiment the method may include executing the additional statement-level database trigger, where executing the additional statement-level database trigger includes accessing the first reference table. In various embodiments multiple triggers may be defined for the same statement and target arrangement, and all triggers defined for the same target arrangement (e.g., target database view) are executed using the same set of reference tables.

Method 600 may also, in various embodiments, include generating a second reference table, or set of reference tables, for a second target arrangement specified by the first database operation statement. In such an embodiment the method may further include storing trigger information for an additional statement-level database trigger defined for the second target arrangement and executing the additional statement-level database trigger, where executing the additional statement-level database trigger includes accessing the second reference table. In various embodiments, multiple sets of reference tables may be generated for database operation statements specifying multiple target arrangements, and a trigger defined for a particular target arrangement accesses the reference table or tables for that arrangement when executing.

Figure 7:
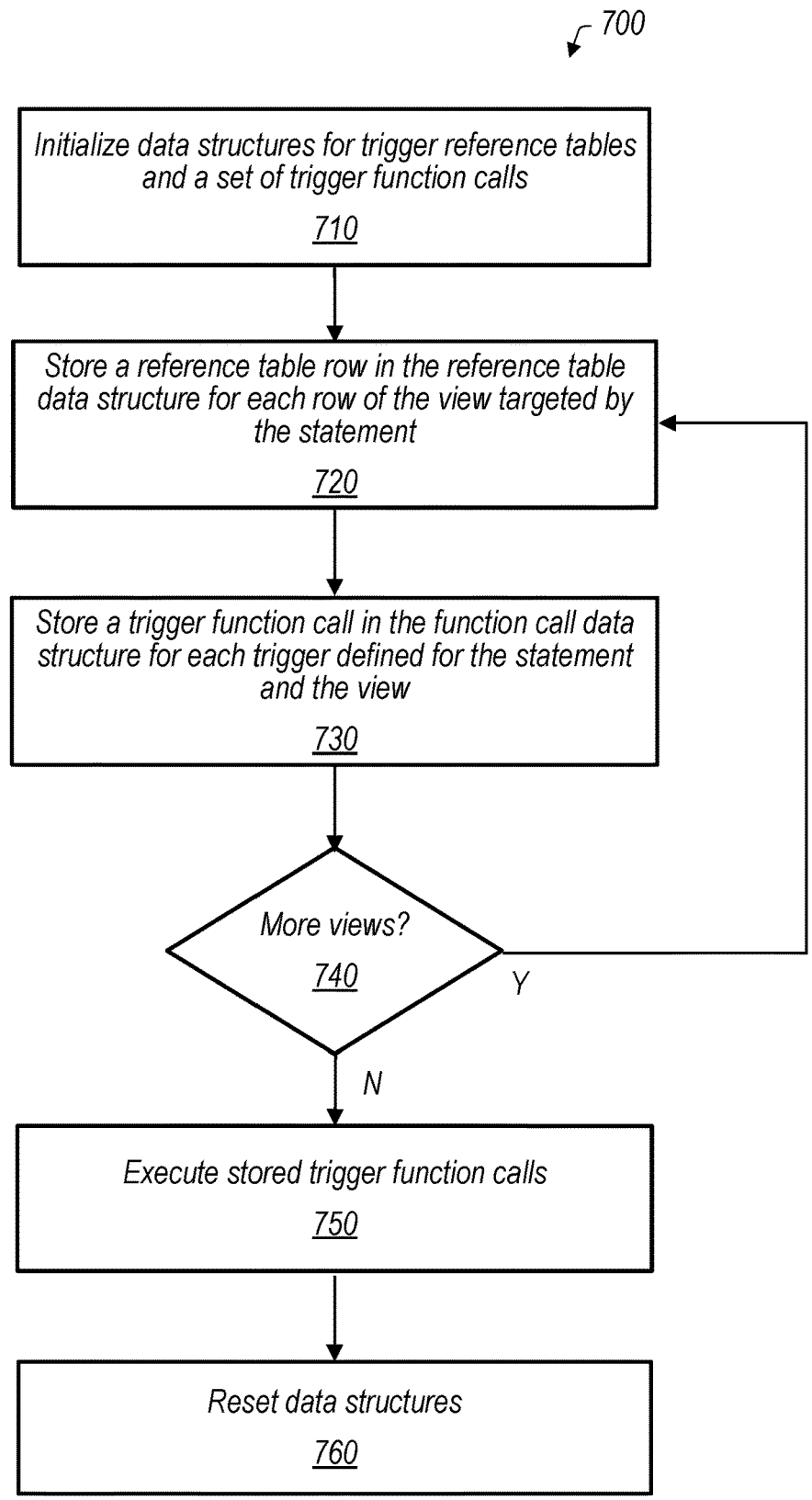

FIG. 7 illustrates a flow diagram of a method 700. Method 700 is one embodiment of a method performed by a computer system such as a database node to execute one or more statement-level INSTEAD OF database triggers in connection with a given database operation statement. The descriptions and variations described above in connection with method 600 generally apply to similar elements of method 700 as well. Method 700 may be performed by executing program instructions stored on a non-transitory computer-readable medium. In some embodiments, method 700 can include more or fewer blocks than shown in FIG. 7. For example, method 700 includes actions taken for execution of statement-level INSTEAD OF triggers that have been defined for a given database operation statement. Other embodiments of method 700 may include, for example, storing trigger information and/or receiving the database operation statement.

Method 700 includes, at block 710, initializing data structures for trigger reference tables and a set of trigger function calls. In an embodiment, trigger instructions for a trigger, such as instructions 168, are in the form of a function that is called when the trigger is fired. In method 700 a data structure is initialized to store function calls for execution of one or more statement-level INSTEAD OF triggers. A data structure is also initialized for storing one or more reference tables for each database view specified by a database operation statement. In an embodiment, separate per-view data structures are initialized for storing respective sets of reference tables for respective views.

Method 700 continues, at block 720, with storing a reference table row in the reference table data structure for each row of the view targeted by the statement, where the statement is a database operation statement such as statement 145. In an embodiment for which multiple reference tables are generated for a view (such as "old," "new" and/or "delta" reference tables), a reference table row is stored into each of the generated reference tables for each target row of the view. In the case of a statement-level INSTEAD OF trigger defined to not use reference tables, block 720 would not apply because no reference tables would be generated. Method 700 further includes, at block 730, storing a trigger function call in the function call data structure for each trigger defined for the view that the reference table of block 720 is generated for. If multiple triggers are defined for the same statement and view, multiple function calls are stored in the function call data structure. Storing of the trigger function calls may also be referred to herein as "queueing" the trigger function calls for execution.

If additional database views are specified by the database operation statement ("yes" branch of decision block 740) the reference table generation of block 720 and trigger function storage of block 730 are repeated for each view. In an embodiment, a separate reference table data structure for the view is initialized as part of the reference table generation. After all of the tables are generated and trigger function calls are stored for the database operation statement ("no" branch of block 740), the queued trigger function calls are executed (block 750). In this manner, each INSTEAD OF trigger defined for the database operation statement is executed with one function call for the statement, rather than on a per-row basis. The data structures are then reset, at block 760, to be used for another database operation statement. Method 700 is described in terms of database views, but may also be applied to operations on database tables or other data arrangements in other embodiments. In various embodiments, method 700 may include maintaining a global list of reference tables and trigger functions calls for keeping track of active statement-level INSTEAD OF triggers.

Example Computer System

Figure 8:
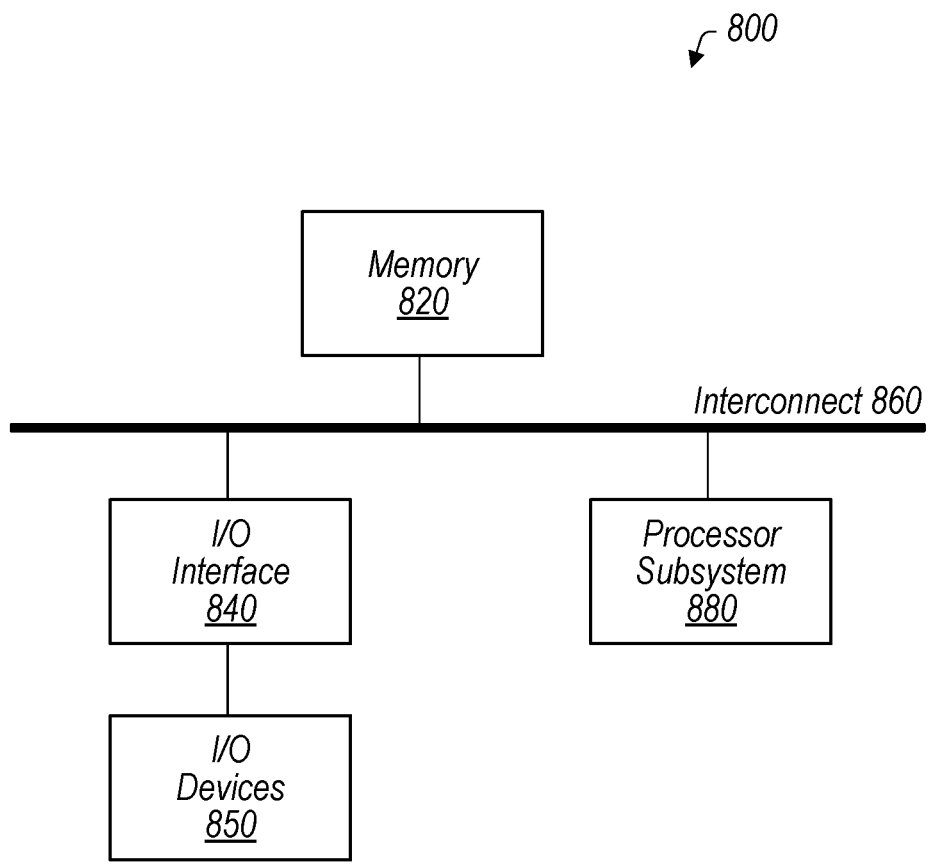
FIG. 8 is a block diagram illustrating elements of a computer system for implementing various systems described in the present disclosure, according to some embodiments.

Turning now to FIG. 8, a block diagram of an example computer system 800, which may implement system 100, database 110, and/or database node 140 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 to perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement database engine 150 and/or database triggers 160 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    storing, by a computer system, trigger information associated with a first statement-level database trigger executable to initiate execution of at least one first trigger instruction for a database instead of performing a particular database operation, on a first database view of selected data from the database, specified by a database operation statement;

receiving, by the computer system, a first database operation statement specifying performance of the particular database operation on the first database view;

identifying, by the computer system, a set of first target rows, within the first database view, targeted by the first database operation statement;

generating, by the computer system, a first reference table associated with the first database view, wherein the first reference table includes rows corresponding to the first target rows; and executing, by the computer system, the first statement-level database trigger instead of executing, rather than before or after executing, the first database operation statement, wherein executing the first statement-level database trigger includes accessing the first reference table and wherein a single execution of the first statement-level database trigger is performed instead of execution of the first database operation statement for multiple of the first target rows.

2. The method of claim 1, wherein a given row, in the first reference table, corresponding to a given first target row includes original data values reflecting a state of the given first target row without performing the particular database operation.

3. The method of claim 1, wherein a given row, in the first reference table, corresponding to a given first target row includes updated data values reflecting a state of the given first target row if the particular database operation is performed.

4. The method of claim 1, wherein a given row, in the first reference table, corresponding to a given first target row includes both original data values reflecting a state of the given first target row without performing the particular database operation and updated data values reflecting a state of the given first target row if the particular database operation is performed.

5. The method of claim 1, further comprising:

storing, by the computer system, trigger information associated with a second statement-level database trigger executable to initiate execution of at least one second trigger instruction for the database instead of performing the particular database operation on the first database view; and executing, by the computer system, the second statement-level database trigger instead of executing the first database operation statement, wherein executing the second statement-level database trigger includes accessing the first reference table.

6. The method of claim 1, wherein the first database operation statement further specifies a second database view of selected data from the database, and further comprising:

identifying, by the computer system, a set of second target rows, within the second database view, targeted by the first database operation statement; and generating, by the computer system, a second reference table associated with the second database view, wherein the second reference table includes rows corresponding to the second target rows.

7. A non-transitory computer readable medium having program instructions stored thereon that are capable of causing a computer system to perform operations comprising:

storing trigger information associated with a first statement-level database trigger executable to initiate execution of at least one first trigger instruction for a database instead of performing a particular database operation, on a first database view of selected data from the database, specified by a database operation statement;

receiving a first database operation statement specifying performance of the particular database operation on the first database view;

identifying a set of first target rows, within the first database view, targeted by the first database operation statement;

generating a first reference table associated with the first database view, wherein the first reference table includes rows corresponding to the first target rows; and executing the first statement-level database trigger instead of executing, rather than before or after executing, the first database operation statement, wherein executing the first statement-level database trigger includes accessing the first reference table and wherein a single execution of the first statement-level database trigger is performed instead of execution of the first database operation statement for multiple of the first target rows.

8. The computer readable medium of claim 7, wherein a given row, in the first reference table, corresponding to a given first target row includes original data values reflecting a state of the given first target row without performing the particular database operation.

9. The computer readable medium of claim 7, wherein a given row, in the first reference table, corresponding to a given first target row includes updated data values reflecting a state of the given first target row if the particular database operation is performed.

10. The computer readable medium of claim 7, wherein a given row, in the first reference table, corresponding to a given first target row includes both original data values reflecting a state of the given first target row without performing the particular database operation and updated data values reflecting a state of the given first target row if the particular database operation is performed.

11. The computer readable medium of claim 7, wherein the operations further comprise:

storing trigger information associated with a second statement-level database trigger executable to initiate execution of at least one second trigger instruction for the database instead of performing the particular database operation on the first database view; and executing the second statement-level database trigger instead of executing the first database operation statement, wherein executing the second statement-level database trigger includes accessing the first reference table.

12. The computer readable medium of claim 7, wherein the first database operation statement further specifies a second database view of selected data from the database, and the operations further comprise:

identifying a set of second target rows, within the second database view, targeted by the first database operation statement; and generating a second reference table associated with the second database view, wherein the second reference table includes rows corresponding to the second target rows.

13. A system, comprising:

at least one processor; and memory having program instructions stored thereon that are executable by the at least one processor to cause the system to perform operations comprising:

storing trigger information associated with a first statement-level database trigger executable to initiate execution of at least one first trigger instruction for a database instead of performing a particular database operation, on a first target arrangement, into rows and columns, of data from the database, specified by a database operation statement;

receiving a first database operation statement specifying performance of the particular database operation on the first target arrangement;

identifying a set of first target rows, within the first target arrangement, targeted by the first database operation statement;

generating a first reference table associated with the first target arrangement, wherein the first reference table includes rows corresponding to the first target rows; and executing the first statement-level database trigger instead of executing, rather than before or after executing, the first database operation statement, wherein executing the first statement-level database trigger includes accessing the first reference table and wherein a single execution of the first statement-level database trigger is performed instead of execution of the first database operation statement for multiple of the first target rows.

14. The system of claim 13, wherein the first target arrangement is a database view specified by a query of the database.

15. The system of claim 13, wherein a given row, in the first reference table, corresponding to a given first target row includes original data values reflecting a state of the given first target row without performing the particular database operation.

16. The system of claim 13, wherein a given row, in the first reference table, corresponding to a given first target row includes updated data values reflecting a state of the given first target row if the particular database operation is performed.

17. The system of claim 13, wherein a given row, in the first reference table, corresponding to a given first target row includes both original data values reflecting a state of the given first target row without performing the particular database operation and updated data values reflecting a state of the given first target row if the particular database operation is performed.

18. The system of claim 13, wherein the operations further comprise:

storing trigger information associated with a second statement-level database trigger executable to initiate execution of at least one second trigger instruction for the database instead of performing the particular database operation on the first target arrangement; and executing the second statement-level database trigger instead of executing the first database operation statement, wherein executing the second statement-level database trigger includes accessing the first reference table.

19. The system of claim 13, wherein the first database operation statement further specifies a second target arrangement of rows and columns from the database, and the operations further comprise:

identifying a set of second target rows, within the second target arrangement, targeted by the first database operation statement; and generating a second reference table associated with the second target arrangement, wherein the second reference table includes rows corresponding to the second target rows.

20. The system of claim 19, wherein the operations further comprise:

storing trigger information associated with a second statement-level database trigger executable to initiate execution of at least one second trigger instruction for the database instead of performing the particular database operation on the second target arrangement; and executing the second statement-level database trigger instead of executing the first database operation statement, wherein executing the second statement-level database trigger includes accessing the second reference table.

* * * * *